United States Patent [19]
Fenner et al.

[11] Patent Number: 5,009,501
[45] Date of Patent: Apr. 23, 1991

[54] A REMOTELY CONTROLLABLE POSITION INDICATOR SYSTEM

[76] Inventors: David F. Fenner, 2 Bishops Green, Barnston Great Dunmow Essex; John S. Menown, Stoke House, Roxwell Road, Writtle Essex, both of United Kingdom

[21] Appl. No.: 365,164
[22] PCT Filed: Nov. 26, 1987
[86] PCT No.: PCT/GB87/00844
  § 371 Date: Jul. 27, 1989
  § 102(e) Date: Jul. 27, 1989
[87] PCT Pub. No.: WO88/04060
  PCT Pub. Date: Jun. 2, 1988
[51] Int. Cl.⁵ .......................... G01C 3/10; G01C 1/00
[52] U.S. Cl. ........................ 356/152; 356/1; 356/4; 356/141; 250/203.3
[58] Field of Search ............ 356/1, 4, 141, 152; 250/203 R, 203.3

[56] References Cited
U.S. PATENT DOCUMENTS 3,917,412 11/1975 Stoutmeyer et al. ............ 356/152
4,583,862 4/1986 Ferrar et al. .................... 356/152
4,649,504 3/1987 Krouglicof et al. ............. 356/141 X
4,836,778 6/1989 Baumrind et al. ............... 356/152 X
4,840,069 6/1989 Hampton et al. ................ 356/141 X Primary Examiner—Linda J. Wallace
Attorney, Agent, or Firm—Thomas E. Sisson

[57] ABSTRACT

A remotely controllable position indicator system arranged to determine the relative position of two bodies and their relative orientation. A movable remote control device is controllable to transmit command radiation signals. A fixed reference station executes commands represented by the command radiation signals. The remote control device has a transmitter while the reference station has a receiver or receivers which monitors the intensity of the radiation received and distinguishes the source of the radiation. A computer is programmed to determine the direction of the reference station from the remote control device using a comparison of monitored intensity of radiation received from the transmitter to give the direction of the receiver from the directional transmitter. One or more of the transmitters is controllable to transmit command signals and the receiver is arranged to receive the command signal. A switch for the transmitter or transmitters initiates radiation command signals to enable an operator to selectively point at a target and then issue a command radiation signal for execution by the reference station.

17 Claims, 8 Drawing Sheets

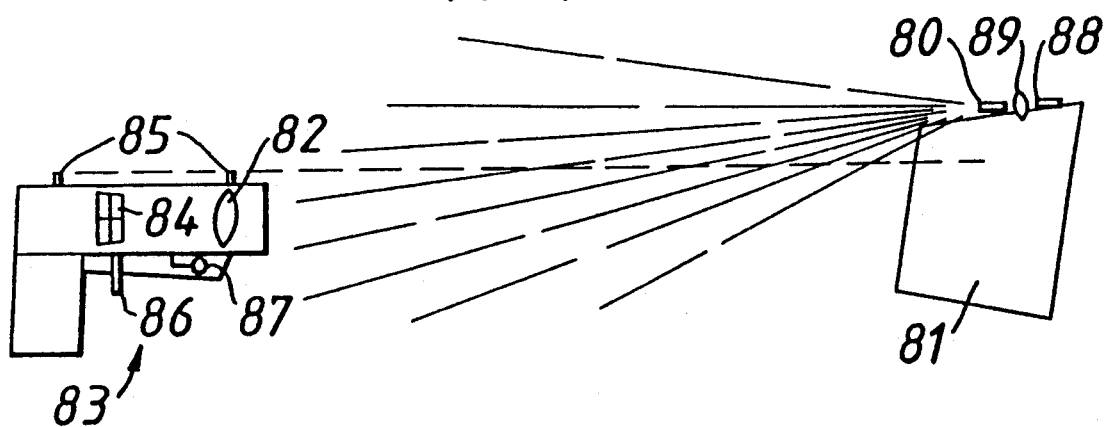
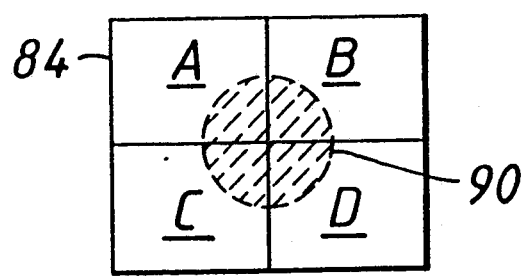
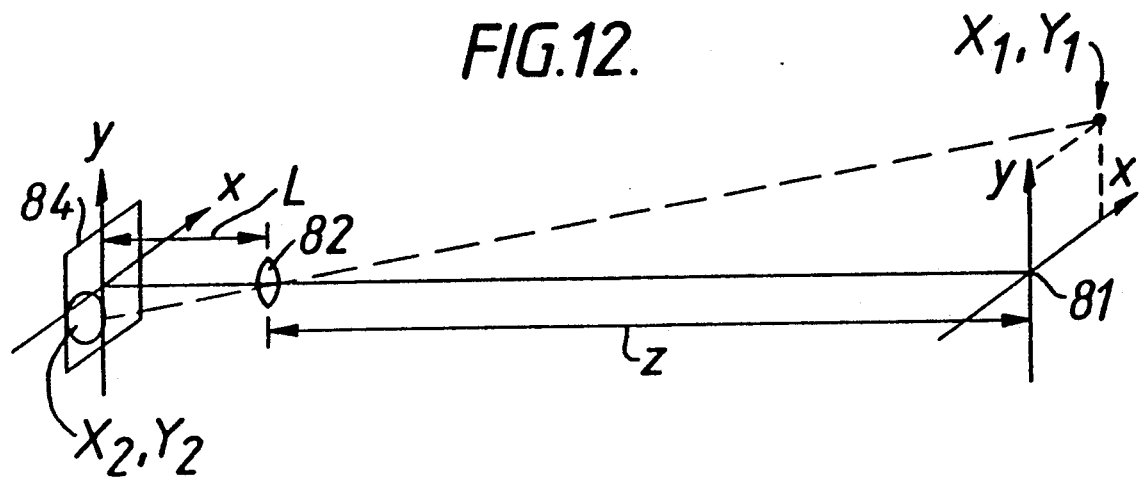

A REMOTELY CONTROLLABLE POSITION INDICATOR SYSTEM

This invention relates to locating systems for use in a wide variety of applications.

Many applications are primarily directed to the domestic market and particularly for use with video games where interaction is required between targets on a screen and a toy gun or other toy weapon, and possibly the relative location of players of the games and the screen during the playing of the game. Other main interest arises where a user of a video screen wishes to interact with images on the screen to respond to interrogation by or to control those images, for example to select items on a menu displayed on the screen by remotely pointing towards chosen regions of the screen. In this context a shopping list could be compiled, that is programmed into a machine, by selectively pointing to items in turn which appear amongst a displayed list of available items.

In specific applications of interest it is necessary for a remotely hand held implement (toy gun, etc.,) or for a remotely situated body to be able to determine the relative position of the implement or body. The fixing of the relative location also enables decisions to be made at the remote position to alter that position as may be required or if relayed to the target or screen for the target or screen to respond accordingly, for example, when the gun is pointing at a target on the screen.

According to the invention there is provided a locating system for a body in which the body is movable relative to a fixed reference station, the system including two transmitter and receiver pairs in which the transmitters form one directional transmitter and are situated at the body and the receivers form one directional receiver and are situated at the reference station, means for monitoring the intensity of radiation received by each receiver and means for synchronising the radiation of each transmitter with the monitoring of the intensity, and computer means programmed to determine the direction of the body from the reference station (angle B) and the direction of the reference station from the body (angle A), using a comparison of radiation received between each receiver of the directional receiver from a single transmitter to give the direction of the transmitters from the directional receiver and using a comparison of radiation received by one receiver of the directional receiver from two transmitters of the directional transmitter to give the direction of the receivers from the directional transmitter, in which one or more of the transmitters is controllable to transmit radiation command signals and the receivers are arranged to receive the command signals, including switching means for the transmitter or transmitters to initiate radiation command signals to enable an operator to selectively point at a target and then issue a command radiation signal for execution by the reference station.

The locating system may include three or more transmitters at the body and three or more receivers at the reference station forming two or more different directional transmitters and two or more different directional receivers respectively arranged to form a number of transmitter and receiver pairs for two or more planes in which the computer means is programmed to determine the direction of the body from the reference station and the direction of the reference station from the body in three dimensions.

The computer may be programmed to determine the distance of the body from the reference station using a summation of the radiation received from the transmitters.

The radiation may be pulsed infrared radiation.

The transmitter may be arranged to transmit in four directions positioned equally around a central pointing axis of the body each at approximately 15° to the central axis and the receivers comprise four directional elements positioned equally around a central axis with each element positioned at approximately 15° to a central receiving axis.

In many applications knowledge or calculation of the actual relative positions will be required but in some applications only an approximate determination is sufficient or only the position in respect of one plane need be determined. Thus for example, embodiments may be arranged to be sensitive to measure locations only in respect to the one plane and/or determine only a relative direction of an object and not its distance from a target, screen or the like.

Embodiments of the invention make use of courses of radiation and sensing radiation emitted at different places and as such the radiation can take virtually any form including electromagnetic radiation and sound.

According to which form of radiation is chosen, but as will be well understood by those skilled in the art, certain specific characteristics associated with the chosen form of radiation will affect calibration of equipment, natural dispersment patterns of that form of radiation and so on. For various reasons including the present relative cost of available component devices, relative ease of processing the information especially as ambient variations are then easily discounted, in embodiments of the invention pulsed infrared radiation is generally preferred.

The above systems enable relative angles or relative directions from imaginery lines connecting the source and the body to be determined. For many applications such information is sufficient, for example whether a toy gun, or body, is pointing towards the target can be determined simply by determining the relative angle or direction of the body in relation to the source, which is adjacent the target. If the actual location is required to be determined, that is the distance of the body from the source, then the intensity of radiation received by one of the detectors or the mean intensity of the two or three detectors may be used. Radiation intensity falls off with distance so that the actual intensity received is used as a measure of distance. In most embodiments this is normally and more easily achieved by periodic calibration of the system.

In the embodiments where both orientation and direction are determined, the system can be used for fitting one part to another, say for an airborne refuelling application. Both the so-called "body", say the fuel line, and a support for the source, say the airborne tanker outlet hose, can be manipulated so as to mate, control means which responds to the relative orientation and position signals being arranged to move the fuel line into position. If a similar system is used on the outlet hose of the tanker, that is detectors are also mounted on the hose and a radiation source is mounted on the fuel line, the outlet hose can also be controlled to move into a suitable mating position. The attraction of such a duel system is that any discrepencies in the operations of the two systems will tend to cancel out and make the mating more efficient. It will be noted that no communication channels as such are necessarily required between the two parties, each party can make its own controlled adjustment. Thus, failure in communication channels between the tanker and the plane being fuelled cannot affect the successful mating.

Embodiments of the invention will now be described by way of example with reference to the accompanying drawings in which:

FIG. 10 is a third representation of a video game;

FIG. 11 is a view of a detector used in FIG. 10;

FIG. 12 is a schematic representation of FIG. 10;

Figure 1:
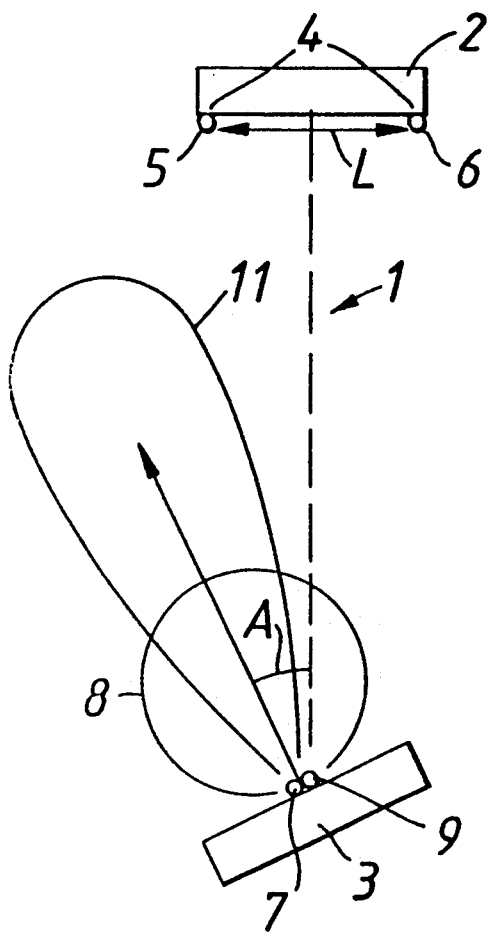
FIG. 1 is a schematic representation of a locating system.

In FIG. 1 a locating system 1 comprises a first body 2 and a second body 3 which are in the same plane directly opposite to each other with the second body 3 pointing in a direction towards the first body 2 at an angle A. The first body 2 is provided with a directional radiation detector 4 comprising two infrared photodetectors 5, 6 spaced by a fixed distance L. The second body 3 is provided with a first radiation source which is an infrared LED 7 having a wide field of radiation represented by the line 8 showing the relative intensity of the radiation of the LED with angle, and a second radiation source which is another infrared LED 9 having a narrow field of radiation represented by the line 11.

Figure 2:
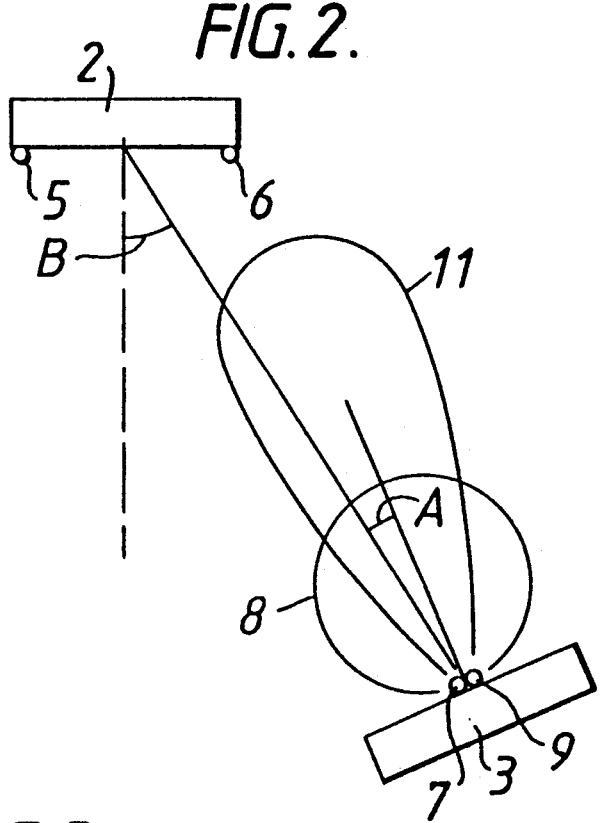
FIG. 2 is a schematic representation of the locating system of FIG. 1 in another position.

In FIG. 2 the second body 3 is in another position such that a line through the centres of the bodies subtends an angle B to the transverse axis of the first body 2.

Figure 3:
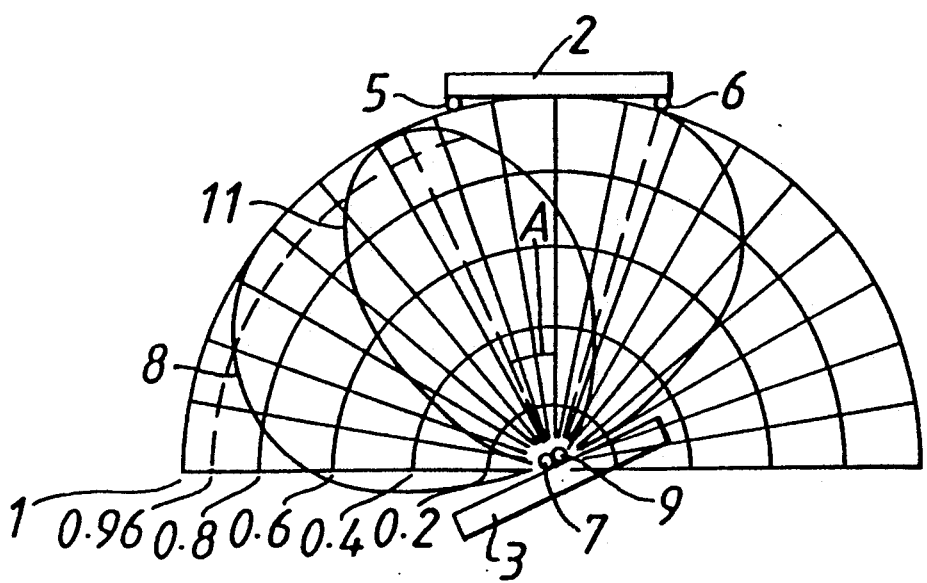
FIG. 3 is a further schematic representation of the locating system of FIG. 1.

In FIG. 3 the field of radiation of the two LEDs is shown on a polar diagram to illustrate the relative intensities of light received at the photodetectors 5, 6.

In use light from the first LED 7 is detected by the directional detector 4 to determine the angle B. For example, in FIG. 1 where the angle B is zero since the second body 3 is directly opposite the first body 2, an equal intensity of light is received at the two photodetectors 5, 6. In FIG. 2 a greater intensity of light will be detected at photodetector 6 than at the photodetector 5 so that the angle B can be calculated from the relative light intensities at each photodetector 5, 6 with a knowledge of the fixed separation L and a knowledge of the shape and fall-off characteristic of the field of radiation 8 of the first LED 7. Light is then detected from the second LED 9 by the directional detector 4. Knowing the position of the second body 3 due to angle B, and knowing the shape and fall-off characteristic of the field of radiation 11 of the second LED 9 the angle A can be calculated.

The calcuation to determine A and B depends upon the different radiation characteristics of the light being emitted by the LED 9 to that of LED 7. Because the light of LED 9 is confined or focussed the intensity of radiation is more concentrated along its central axis than the radiation of the LED 7. The intensity of light measured at the directional detector 4 from the LED 7 is therefore relatively independent of the angle A. Referring to the polar diagram shown in FIG. 3 it can be seen that approximately equal amounts of light are received from the LED 7 at the photodetectors 5, 6 indicating that B is equal to zero, whereas the intensity of light from the LED 9 measured at the photodetector 5 is 0.96 compared to 0.4 at the photodetector 6, allowing the angle A, here equal to 25 degrees, to be calculated.

Figure 4:
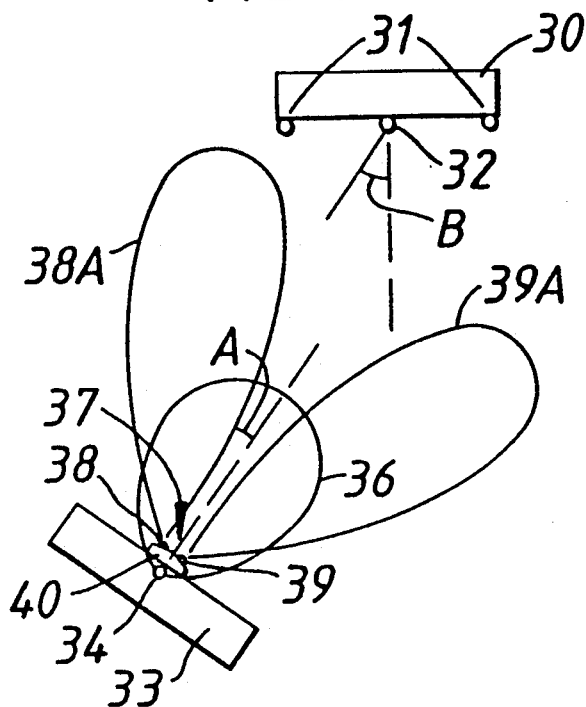
FIG. 4 is a schematic representation of another locating system.
Figure 4A:
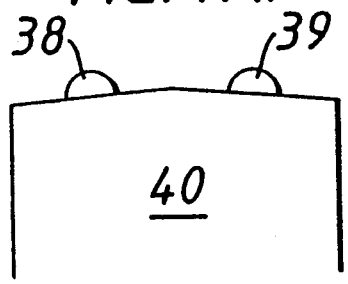
FIG. 4A is a part of the locating system of FIG. 4.

In FIG. 4 a first body 30 has first directional detectors 31 and a detector 32. A second body 33 has a first LED 34 having a wide field of radiation 36 and a second directional radiation source 37 comprising two separate LEDs 38, 39 both having narrow fields of radiation 38A, 39A, with one LED mounted on each of the two front faces of a block 40. The block 40 is shown in more detail in FIG. 4A, in which the two LEDs 38, 39 are mounted on two opposed sloping faces at approximately 5 degrees to the line transverse to the long longitudinal axis of the block 40. This makes the two fields of radiation 38A, 39A point in different directions separated by a mean angle of 10 degrees as shown in FIG. 4.

The angle B is determined by measuring the light from the first LED 34 using the directional detector 31 as hereinbefore described. The direction in which the second body 33 is pointing is determined by angle A measured by the intensity of light at the detector 32 from each of the two LEDs 38, 39 on the directional source 37.

In an alternative arrangement of the locating system of FIG. 4 the two LEDs 38, 39 have a very wide field of radiation acting as point sources. The angle of the faces on the block 40 are arranged so that the fields of radiation 38A, 39A overlap in such a manner that the average intensity from the two LEDs 38, 39 is independent of the angle A. The LED 34 is therefore not required, since the angle B can be determined by the difference in the combined intensities from 38, 39 as they are pulsed at the same time. The LEDs 38 and 39 are then pulsed in succession to determine angle A as before.

In many applications it is sufficient simply to calculate the angle A assuming the angle B is zero, or to calculate the angle B assuming the angle A is zero. In either case this could be carried out using the source 37 in conjunction with the detector 32, without the requirement for the LED 34 and the detector 31.

Figure 5:
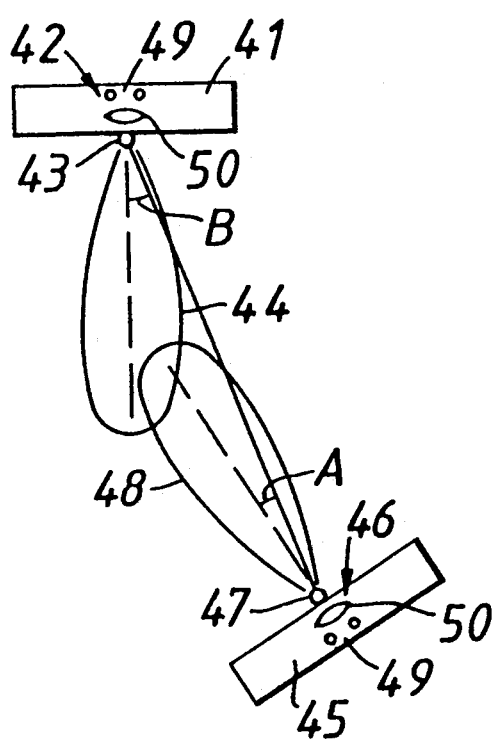
FIG. 5 is a schematic representation of a third locating system.

In FIG. 5 a first body 41 has a first directional detector 42 and a first LED 43 having a narrow field of radiation 44 and a second body 45 has a second directional detector 46 and a second LED 47 having a narrow field of radiation 48. In this embodiment each directional detector 42, 46 comprises a two segment photodetector 49 with a focusing lens 50 in front of the detector 49 so that the segments respond to different fields of vision.

Light from the first LED 43 is received at the second directional detector 46 to give the angle B approximately and light from the second LED 47 is received at the first directional detector 42 to give the angle A approximately. Information relating to the angle B is then transmitted to the first body 41, using the LED 47 as the transmitter and the detector 49 as the receiver.

Figure 6:
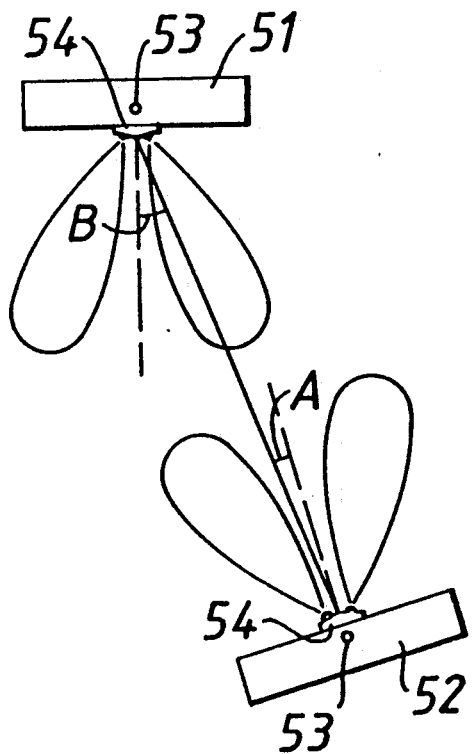
FIG. 6 is a schematic representation of a fourth locating system.

In FIG. 6 both a first body 51 and a second body 52 have a photodetector 53 and a directional radiation source 54. Each directional radiation source 54 is as described with respect to FIG. 4. Light from the source 54 on the first body 51 is detected at the second body 52 by the detector 53 to give the angle B approximately. Light from the source 54 on the second body 52 is then detected at the first body 51 by the detector 53 to give the angle A approximately. Information relating to the angle B is then transmitted to the first body 51, using the source 54 as the transmitter and the detector 53 as the receiver.

Figure 7:
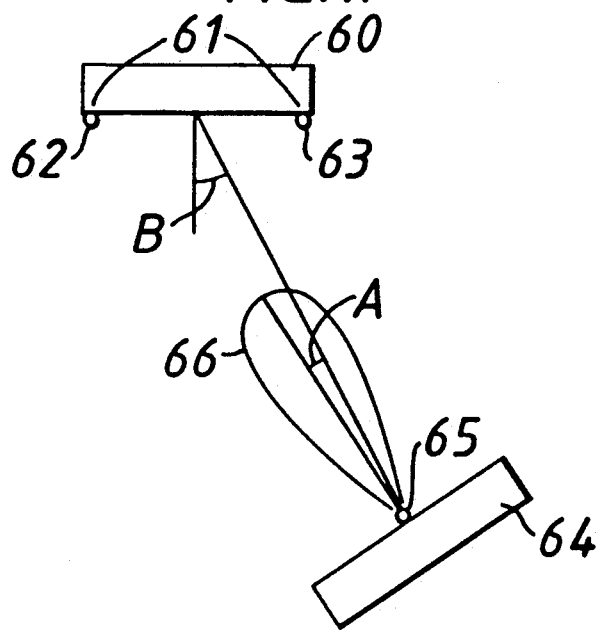
FIG. 7 is a schematic representation of a fifth locating system.

In FIG. 7 a first body 60 has a directional detector 61 comprising two ultrasonic receivers 62, 63 and a second body 64 has a source of radiation provided by an ultrasonic transmitter 65 having a narrow field of radiation 66. In order to determine the angle B the phase of the ultrasonic radiation is measured between the two detectors 62, 63. For example, where B is equal to zero the phase difference is zero since the radiation takes the same time to propagate to both detectors 62, 63. The phase difference is independent of the angle A. The angle A is determined by the difference in the intensities measured at the two detectors 62, 63 and the range between the two bodies 60 and 64 is calculated by the absolute intensity measured at the detector 61.

Figure 8:
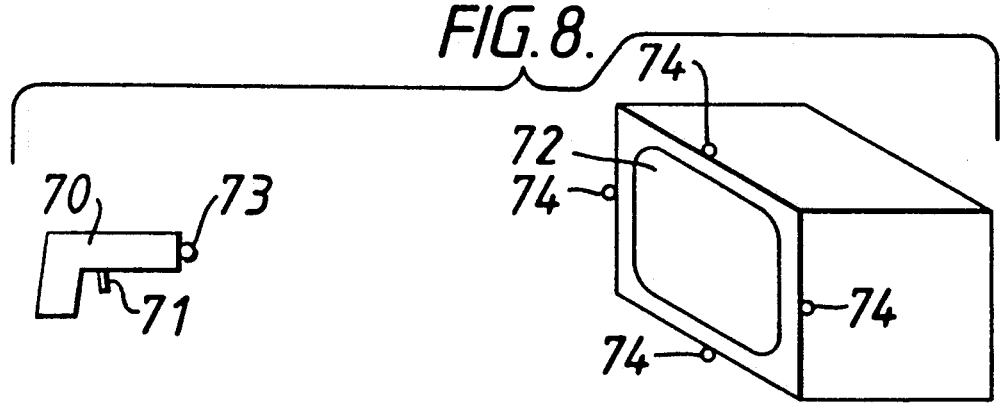
FIG. 8 is a first schematic representation of a video game shown in FIG. 7.

In FIG. 8 a video game is shown in which a first body in the form of a gun 70 having a trigger 71 is used to aim at and "shoot" targets, generated by a computer (not shown), on a second body in the form of a television screen 72. Attached to the gun 70 is a ultrasonic source of radiation 73 having a narrow field of radiation as described with reference to FIG. 7. Equally spaced about the periphery of the television screen 72 are four ultrasonic receivers 74. The orientation and position of the gun 70 with respect to the centre of the television screen 72 are calculated as described with respect to FIG. 7. The distance of the gun 70 from the screen 72 can be calculated from the absolute intensity of radiation received from the transmitter 65. Knowing the angles A and B and the distance it is possible to calculate where the gun 70 is pointing on the screen 72.

The carrier frequency of the transmitter is 40K Hz modulated at a frequency of 500 Hz to produce a pulse train of sound waves. This enables the orientation given by angle B in FIG. 7 to be determined to an adequate accuracy for use with a 50 cm screen 72 with the gun 70 held typically up to 3 meters away from the screen 72. When the trigger 71 is pulled the modulation frequency changes to 550 Hz, which enables the computer to determine when the trigger is pulled and hence to indicate on the screen whether a target is "hit".

By calculating where the gun 70 is in relation to the centre of the screen 72 it is possible for the computer to take defensive steps to protect the targets. For example, the gun 70 could be used with a screen 72 where a target is hidden behind a movable obstruction. If the computer has determined where the gun 70 is, it can move the obstruction appropriately to defend the target.

Figure 9:
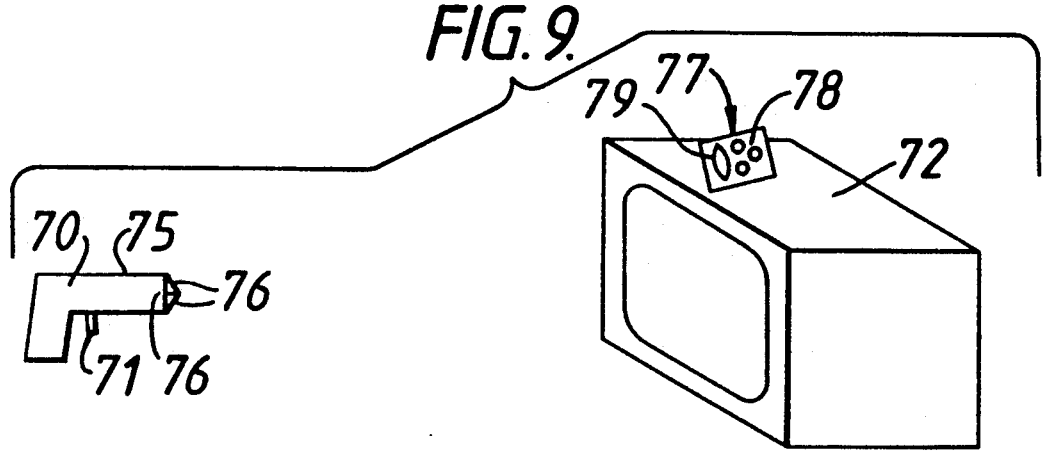
FIG. 9 is a second schematic representation of a video game.
Figure 13:
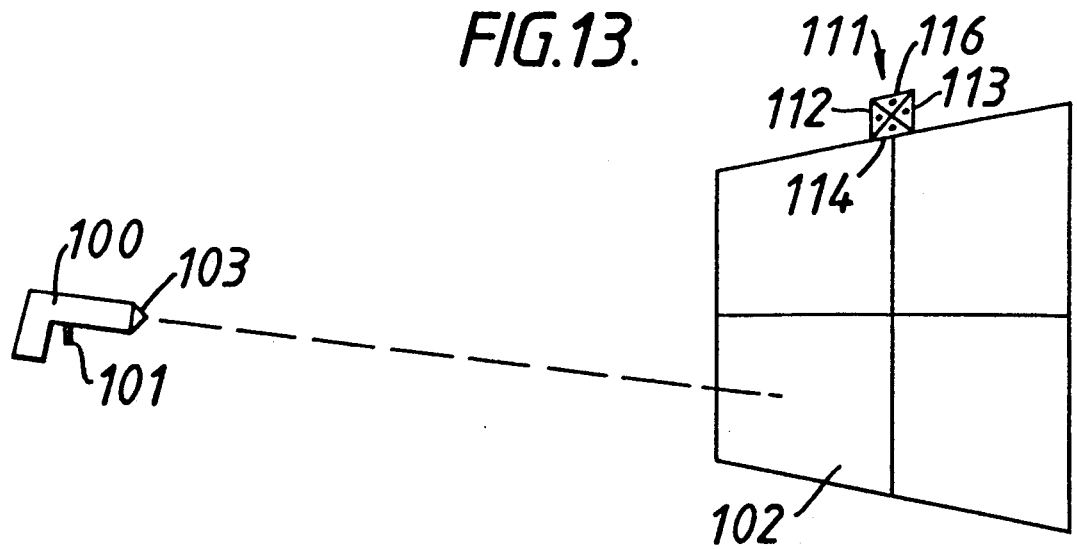
FIG. 13 is a video game according to the present invention.

In FIG. 9 a gun 70 is used in conjunction with a television screen 72 as hereinbefore described with reference to FIG. 8. The gun 70 has a directional source 75 comprising 3 LEDs 76 mounted in the matter of the LEDs 38, 39 in FIG. 4A, pointing in three different directions towards the screen 72, to generate information in two plates. A directional detector 77 having a three segment detector 78 and a lens 79 is mounted on the television screen 72.

To determine the angle B the relative intensities of light from the LEDs 76 is measured on the three detectors 78. To determine the angle A the LEDs 76 are multiplexed in time together with a blank interval of time for synchronisation, to determine the intensity from each LED 76 in turn. When the trigger 71 is pulled the pulse frequency changes.

Where it is necessary to distinguish the information sent from more than one source of radiation, time division multiplexing may be used as hereinbefore described. Alternatively the different sources may be pulsed at different frequencies or the different sources may be arranged to transmit at different wavelengths of radiation. Furthermore it is possible to use polarized light to distinguish between two sources of radiation.

In the aforementioned arrangements it has been shown that it is possible to determine the direction of the second body from the first body angle B and the direction of the first body from the first body Angle A. It is noted that angles A and B depend on the arrangement of the directional detectors or directional dispositions of the bodies so that the relative orientation of the bodies is determined by angles A and B.

Turning now to FIGS. 10 to 12, by way of background, in conventional display systems a joystick or mouse is often used to move a cursor about on a visual display unit. This allows, for example, graphics, menu selection and video games to be used in conjunction with the display system. A remote controller can be provided which allows considerably more freedom of action than a joystick or mouse for example.

Referring to FIG. 10, the remote controller arrangement comprises an infrared light emitting diode 80 mounted on a visual display unit 81, a lens 82 fixed inside at the front of a pointing device 83 and an optical directional detector 84, also mounted inside the pointing device 83. The pointing device 83 is in the form of a toy-gun and has sights 85 and a trigger 86. The diode 80 is positioned in the middle of the top of the visual display unit 81.

The remote controller is arranged so that when the pointing device 83 is aimed at the centre of the visual display unit 81, radiation from the diode 80 impinges on the centre of the detector 84. The axis of the lens 82 is offset from the axis of the pointing device 83 to compensate for the diode 80 not being at the centre of the screen of the visual display unit 81.

Means for transmitting return signals to the visual display unit 81 are provided by a second infrared light emitting diode 87 located on the pointing device 83, and a second optical directional detector 88 located on the visual display unit 81 adjacent the diode 80. A second lens 89 is mounted in front of the second detector 88. The axis of the second lens 89 is offset from the axis of the second detector 88 so that when the pointing device 83 is pointing at the centre of the screen, radiation from the second diode 87 impinges on the centre of the second detector 88.

FIG. 11 shows the four segments of a quadrant photodetector 83 or 88, labelled A, B, C and D. An image 90 of the radiation from a diode 80 or 87 is shown to be impinging on the centre of the detector 83 or 88.

Referring to FIG. 12 there is shown a geometric representation of a remote controller, in which the pointing device 83 is positioned perpendicularly to the centre of the visual display unit 81. The lens 82 is at a distance z from the centre of the visual display unit 81. The gun 83 is pointing at a position $X_1$, $Y_1$, on the screen of the visual display unit 81 with respect of the centre 0, 0 of the visual display unit 81. The centre of the image 90 of the radiation from the diode 80 impinges on the detector 84 at a position $X_2$, $Y_2$ with respect to the centre 0, 0 of the detector 84. The detector 84 is located at a distance L from the lens 82.

By similar triangles the relationship between the location $X_1$, $Y_1$ on the visual display unit 8 and the location $X_2$, $Y_2$ on the detector 84 is $X_1 = Zx_2/L$, $Y_1 = ZY_2/L$.

These relations are only true if the gun 83 is directly in front of the centre of the visual display unit 81. If the gun si at any other position in front of the visual display unit 81 the calculation of the position $X_1$, $Y_1$, on the visual display unit 81 must be compensated for by calculating the position of the gun 83 with respect to the centre of the visual display unit 81. This is achieved using the second diode 87 and the second detector 88, using the same reasoning given above, to give a location for the gun 83 of z, $X_3$, $Y_3$ with respect to the centre 0, 0, 0 of the visual display unit 81.

The operation of the remote controller is now described, in which the gun 83 is used with a video game displayed on a TV minitor 81.

The distance z is related to the total intensity of radiation from the second diode 87, detected by the second detector 88. In practice the gun 83 is held initially a known distance from the TV monitor to allow the system to be calibrated. The diode 80 is adapted to give a viewing angle of almost 180°, so that the pointing device may be used at a large angle from a central axis of the TV monitor 81. The second diode 87 has a viewing angle of approximately 30° to conserve optical power, and the gun 83 is used at a typical distance of 2 meters from the TV monitor 81.

The location $X_2$ is related to the intensity of radiation impinging on the segments A, C divided by the total intensity of radiation impinging on all four of the segments.

The location $Y_2$ is related to the intensity of radiation impinging on the segments A, B divided by the total intensity of radiation.

In order to transmit return signals to the normal control system of the TV monitor 81, the diode 80 is pulsed in phase with the faster synchronisation pulses for the line and field scan on the TV monitor 81. The pulses are detected by the detector 84 and reproduced at the gun 83 and phase shifted in accordance with the information from the detector 84, related to the location $X_2$, $Y_2$. The second diode 87 is then pulsed with this information, together with a signal from the trigger 86. The second detector 88 receives the information which is then used to calculate the location $X_1$, $Y_1$ on the visual display unit 8 according to the equations $X_1 = Zx_2/L$ and $Y_1 = -ZY_2/L$, taking into account the position Z, $X_3$, $Y_3$ of the gun 83. If the location corresponds to a target on the visual display unit 81 and if a signal is coterminously received from the trigger 86, then the target is 'hit'.

Alternative methods of providing the return signals could be used. For example, the gun 83 could be wire connected to the TV monitor 8 to allow electrical transmission of the return signals. Alternatively a retroreflective mirror arrangement could be mounted on the gun 83, together with an optical modulator to modulate the optical return signals to the control system of the TV monitor 81, in accordance with the location $X_2$, $Y_2$. The modular could be a chopper. The mirror could also be mounted at an angle on a rotating disc.

It should be appreciated that for the remote controller to operate correctly the X-axis of the pointing device and the X-axis of the visual display unit should be kept at least approximately parallel.

FIGS. 13 to 17 show a locating system for use for a video game or to move a cursor across a television screen. The system comprises a gun 100 having a trigger 101 for use with a television screen 102. The gun has a directional transmitter 103 comprising four infra-red LEDs, of the type V394P III made by AEG-Telefunken, which are not focused. The four LEDs include a left pointing LED 106 a right pointing LED 107, an upward pointing LED 108 and a downward pointing LED 109 (see FIG. 14) in the direction towards the television screen 102. The LEDs are mounted on the faces of a square based pyramid having sloping faces at an angle of approximately 15° to the base of the pyramid. The gun is battery powered having a mercury switch inside which switches the gun on when the gun is held upright.

A directional receiver 111 is positioned on top of the television screen 102 and comprises four infra-red detectors having wide receiving angles. The directional receiver 111 includes a left pointing detector 112, a right pointing detector 113, an upward pointing detector 114, and a downward pointing detector 116, in a direction towards the gun. The detectors are mounted on the inside faces of an open square based pyramid having sloping faces at an angle of approximately 15° to the open base.

Figure 14:
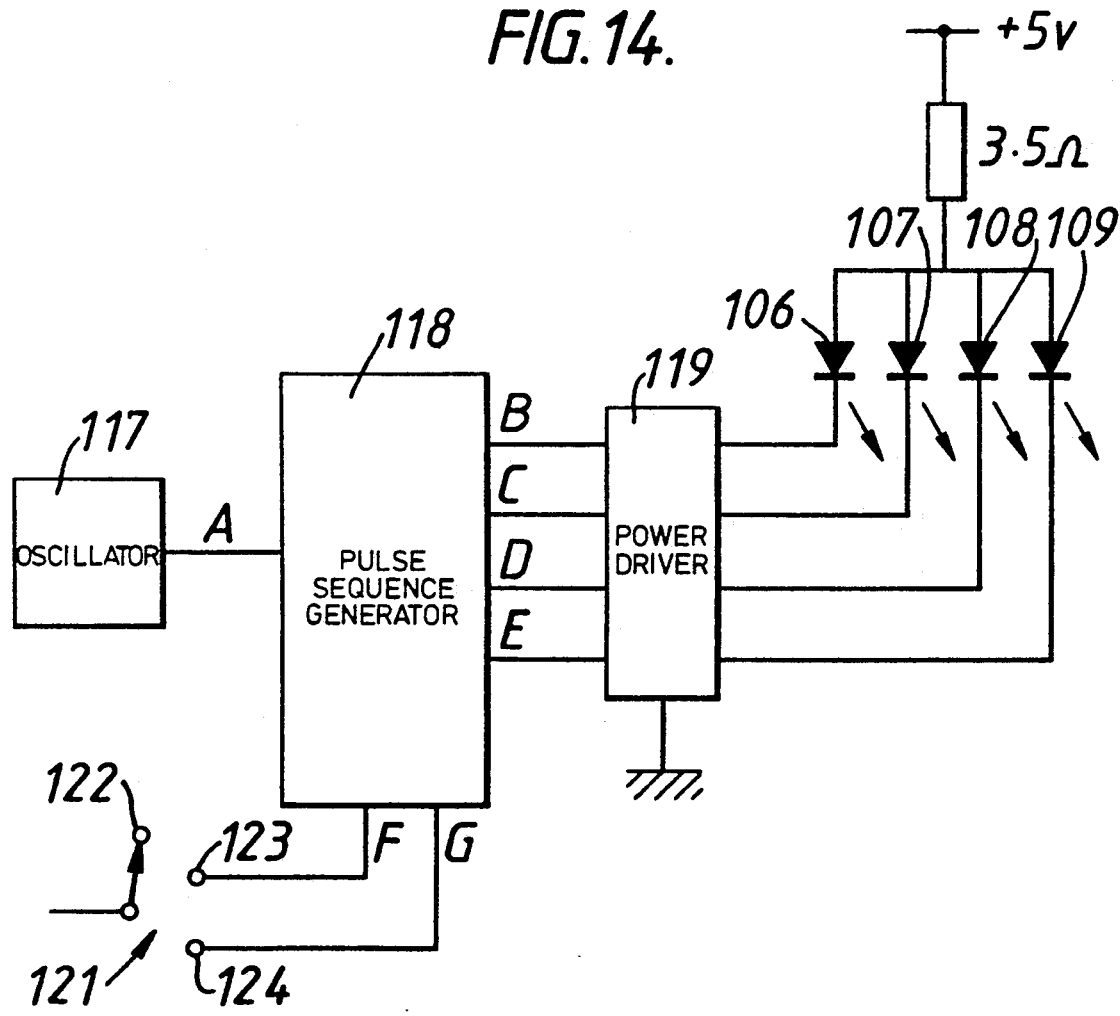
FIG. 14 is a block diagram of a transmitter circuit used in the video game of FIG. 13.
Figure 15:
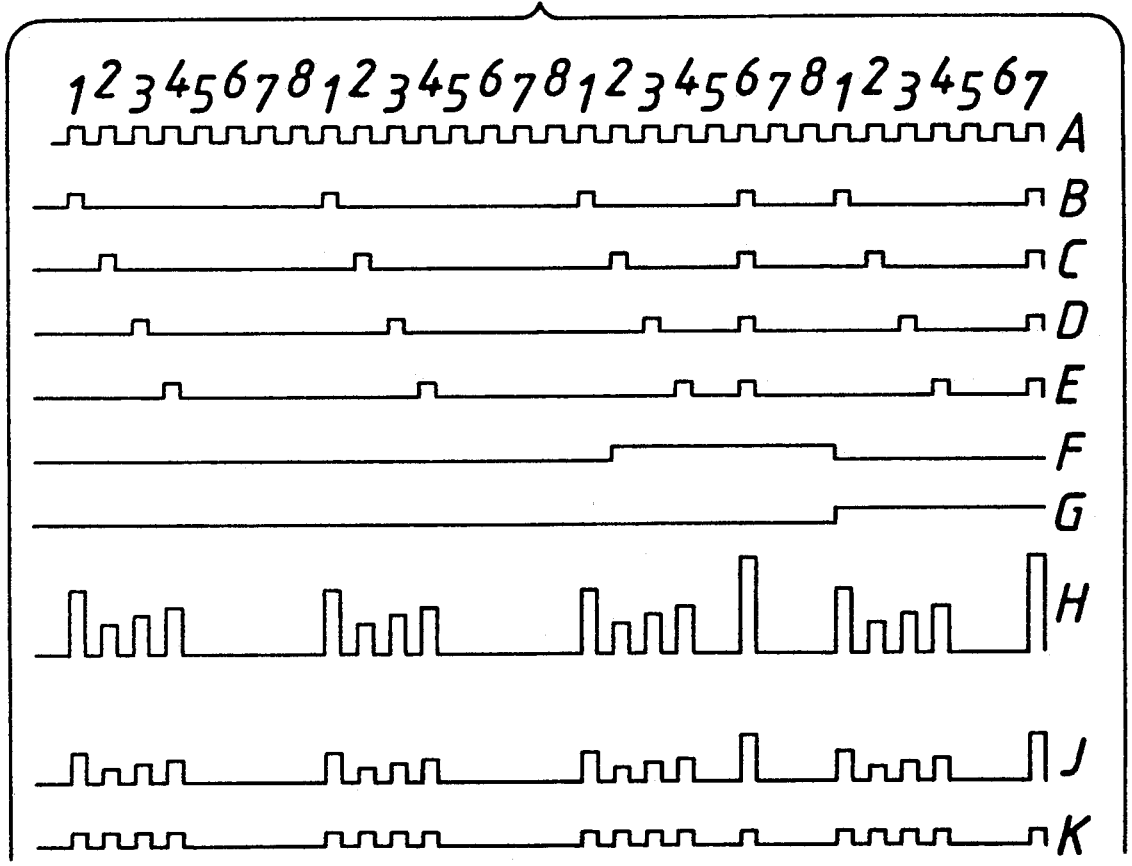
FIG. 15 is a timing diagram of the waveforms generated in the circuit of FIG. 14.

FIG. 14 shows the circuit details inside the gun 100, and FIG. 15 shows the waveforms generated.

An oscillator 117, running at 25 kHz is used to clock a pulse sequence generator 118 to provide signals B, C, D and E which are used to control the output of the four LEDs 106, 107, 108 and 109 respectively through a power driver 119.

A three-pole switch 121 is connected to the trigger 101. It has an off position 122 and two controlling positions 123, 124.

Referring to FIG. 15 the LEDs are pulsed in turn over a period of four cycles of the oscillator. When the trigger 101 is in the first controlling position 123, a pulse is generated to drive all four LEDs at the same time on a sixth cycle. When the trigger 101 is in the second controlling position 124 a pulse is generated to drive all four LEDs on a seventh cycle. After the eighth cycle the sequence is repeated.

The waveforms H and J show the signals that are received at the left pointing detector 112 and the right pointing detector 113 respectively. The aim of the gun 100 relative to the receiver, which gives the previously referred to angle A see for example FIG. 1 is determined from the relative strengths of the signals received from pairs of LEDs by any one of the detectors. In this example the gun 100 is aimed downwards and to the left of the centre of the television screen 102. The signal received at each of the detectors from the left pointing LED 106 is therefore greater than the signal received from the right pointing LED 107 and the signal received from the upward pointing LED 108 is less than that from the downward pointing LED 109.

The position of the gun 100, that is the direction of the gun from the receiver 111, which gives the previously referred to angle B, is determined from the relative strengths of the signals received from one of the LEDs between pairs of the detectors.

Figure 16:
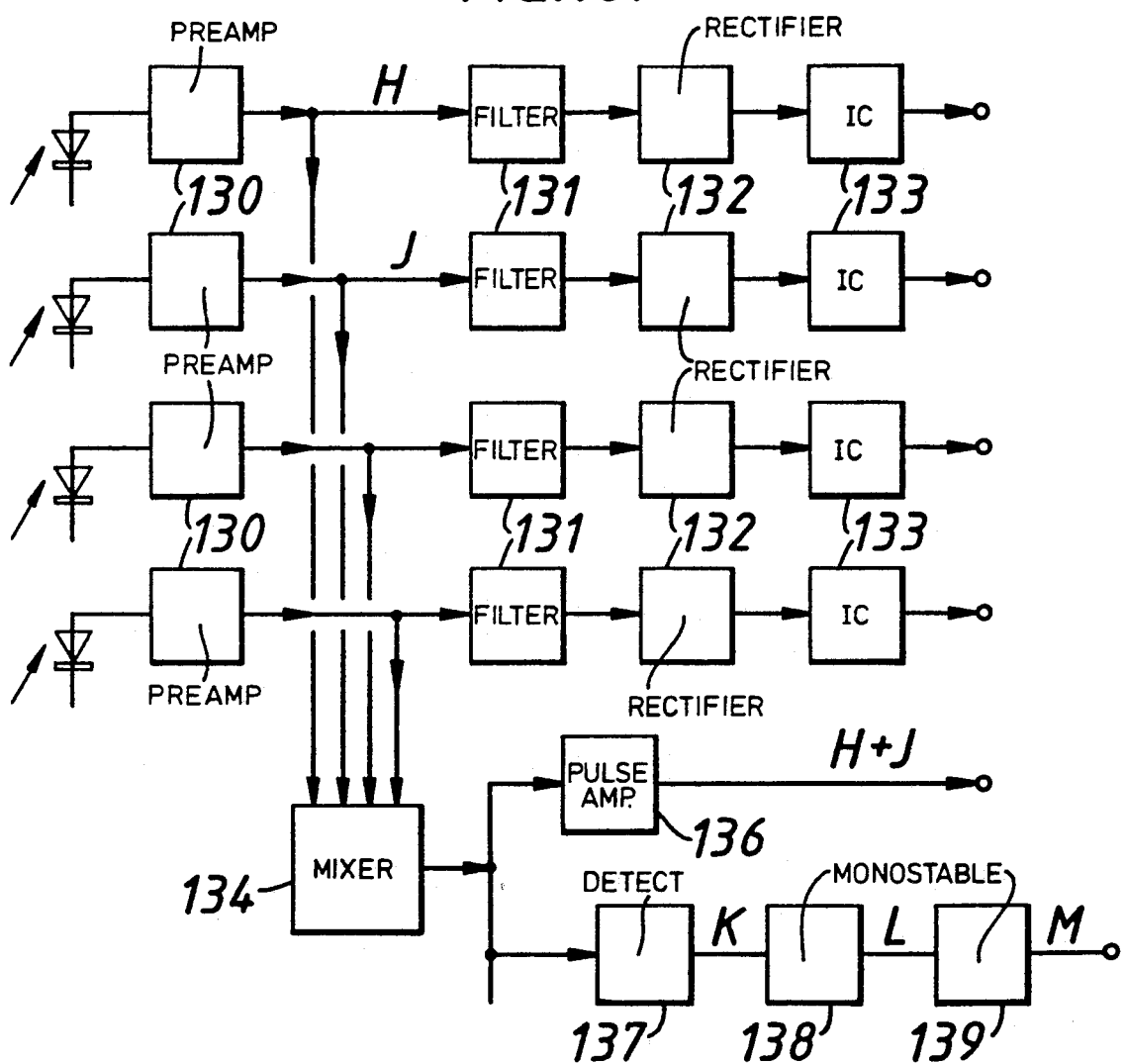
FIG. 16 is a block diagram of a receiver circuit used in the game of FIG. 13.

FIG. 16 shows the circuitry that is used at the directional detector 111. The signal received at each detector is first amplified in the pre-amplifiers 130. The amplified signals are then fed into individual filters 131, rectifiers 132 and integrating circuits 133 and at the same time each of the amplified signals are fed into a mixer circuit 134. The output of each of the integrating circuits 133 from each of the detectors is used to determine the position of the gun 100 relative to the television screen 102.

The mixer 134 combines the signals from each detector and then the output of the mixer 134 is divided into a pulse amplifier 136 and a zero crossing detector 137. The output of the pulse amplifier 136 is used to determine the aim of the gun 100. By combining the signals using the mixer 134 the descrimination of the detector is improved. The error due to the fact that a single detector at the centre of the pyramid is not used is also reduced. The output of the zero crossing detector 137 which has the waveform k is used to feed two monostables 138 and 139 which are used to synchronize the detector, with the pulses from the four LEDs.

Figure 17:
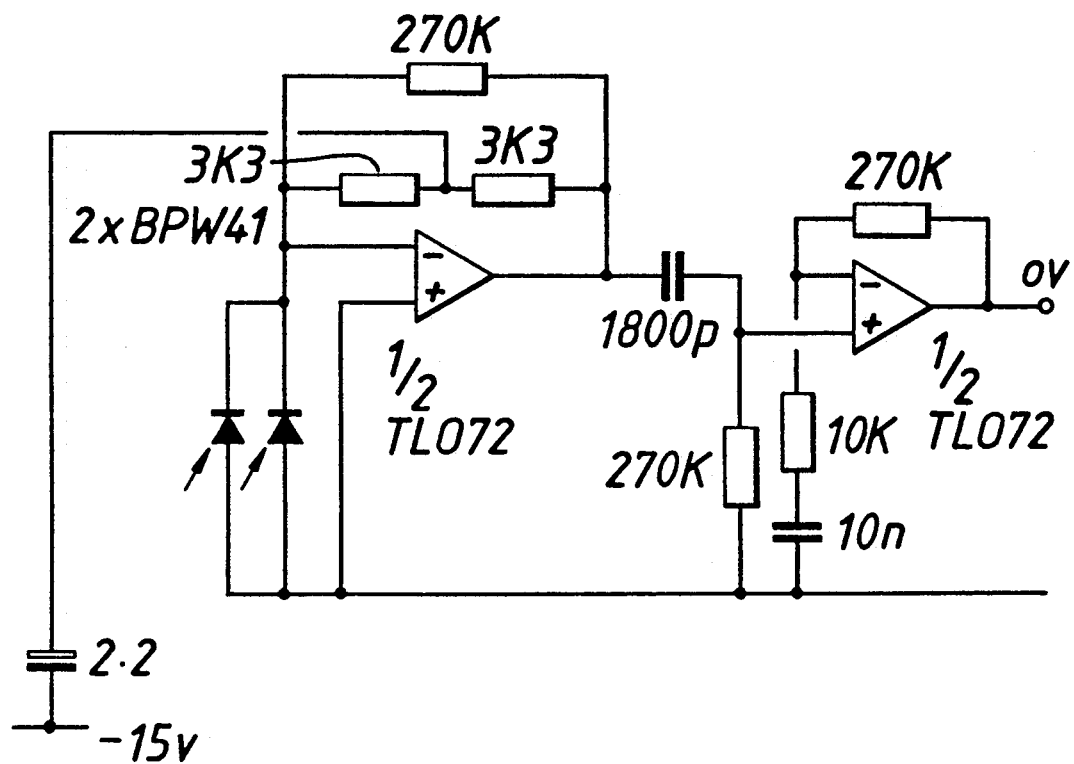
FIG. 17 is a circuit diagram used in FIG. 16.

FIG. 17 shows a circuit in the receiver to amplify the detector signal.

Figure 18:
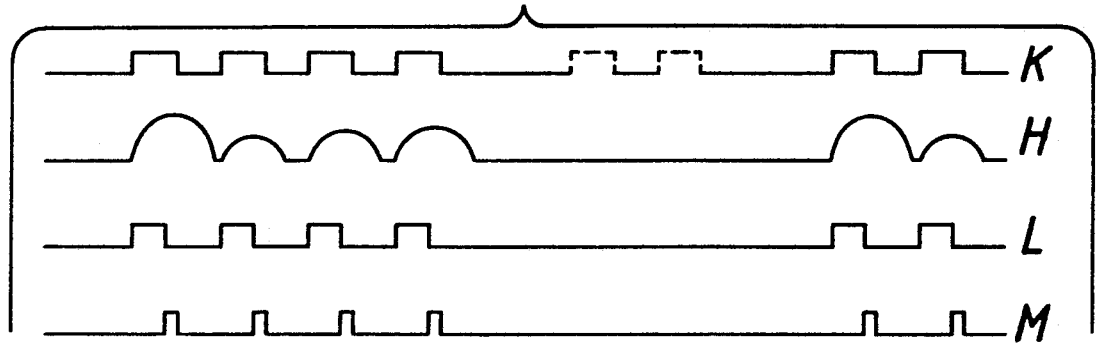
FIG. 18 shows receiver waveforms.

FIG. 18 shows the receiver waveforms of the synchronisation.

A computer is used to receive the signals from the detector circuit and process them to control the television screen 102. The fact that the directional detector is not mounted at the centre of the television screen 102 is taken into account in the processing software of the computer.

The distance of the gun 100 from the screen 102 is calculated from the combined intensity received by the receiver 111 from all of the LEDs. The calculations of the range and angles A and B are then used to compute where on the screen 102 the gun is pointing, as described with reference to FIG. 12. The greater the distance of the gun from the screen the more the point position moves over the screen for each unit of angular change of aim.

It is important to note that the gun 100 can be placed almost anywhere in front of the screen 102 and its direction and aim relative to the screen 102 can be determined. The output of the detector is analogue so that pointing position can be anywhere on the screen 102.

In another embodiment it would be possible to use laser LEDs instead of ordinary LEDs to increase the range of the locating system.

The locating system enables the possibility of the use of, for example, a toy-gun with an information display, displaying a video game in three dimensions, because information as to the position of the toy-gun is known by the control of the information display. This information could be used, for example, to put up defences for a target against the toy-gun.

Further examples of uses for the remote controller of the present invention include, an interface for handicapped people with a display system to create drawings or music. The remote controller could be used by an operator, such as a lecturer, at a distance from an information display. The signal from the pointing device could have two levels, for example, to select the cursor and to execute a command from a menu. A well engineered version of the remote controller could be used for target practice and training to replace a conventional firing range.

In the specification the terms "directional transmitters" and "directional receivers" are used. A directional transmitter is capable of transmitting in two or more directions and for three dimensional location at least three directions are required in at least two planes. At least the approximate location of the transmitting elements, that is the sources of transmission must be known and also the mean plane between diverging transmissions or separated elements relative to the movable body or fixed body (or reference station) must be known. The mean planes of response of each pair of detector elements of the directional receiver must be known relative to the movable body or the fixed body with whichever the receiver is associated.

It will be noted that where the aim of a gun or direction of movement of an object relative to a third or fourth object is to be determined or controlled, it is only necessary to know the relative position of the third or other object relative to a reference station (say, the first of the two objects in the early description). The gun (or second object) can then be located and/or directed with reference to the reference station to aim at or travel towards the third or fourth objects.

We claim:

1. A remotely controllable position indicator system, comprising a movable remote control device controllable to transmit command radiation signals, and a fixed reference station adapted to execute commands represented by said command radiation signals, said remote control device further comprising two transmitters forming one directional transmitter and said fixed reference station further comprising a receiver, means for monitoring intensity of radiation received by said receiver, means for distinguishing between radiation from one of said two transmitters and radiation from the other of said two transmitters and computer means programmed to determine the direction of said reference station from said remote control device using a comparison of monitored intensity of radiation received by said receiver from each of said two transmitters of said directional transmitter to give the direction of said receiver from said directional transmitter, in which one or more of said two transmitters is controllable to transmit radiation command signals and said receiver is arranged to receive said command signals, including switching means for said one or more of said two transmitters to initiate radiation command signals to enable an operator to selectively point at a target and then issue a command radiation signal for execution by said reference station.

2. The system of claim 1 wherein said remote control device further comprises more than two transmitters, forming a plurality of different directional transmitters, said distinguishing means being arranged to distinguish between all said transmitters, and said computer means being programmed to determine said direction of said reference station from said remote control device in two dimensions.

3. The system of claim 1 wherein said computer means is programmed to determine from the absolute intensity of radiation monitored at said receiver the distance of said remote control device from said reference station.

4. The system of claim 1 wherein said radiation is pulsed infra red radiation.

5. The system of claim 1 wherein said fixed reference station also comprises two transmitters forming a directional transmitter, said movable remote control device further comprises a receiver, means for monitoring said intensity of radiation received by said receiver of said remote control device and for distinguishing between said radiation received thereby from one of said two transmitters and the other of said two transmitters of said reference station, means for transmitting, via one of said transmitters of said remote control device to said receiver of said reference station, information relating to said monitored intensities, and said computer means programmed to determine the direction of said remote control device from said reference station using a comparison of intensities monitored at said remote control device.

6. A remotely controllable position indicator system comprising a movable remote control device controllable to transmit command radiation signals, and a fixed reference station adapted to execute commands represented by said command radiation signals, said remote control device further comprising a transmitter and said fixed reference station further comprising two receivers, means for monitoring the intensity of radiation received by each of said receivers, and computer means programmed to determine the direction of said remote control device from said reference station using a comparison of monitored intensity of radiation received by each of said receivers from said transmitter to give the direction of said transmitter from said receiver, said transmitter is controllable to transmit radiation command signals and said receivers are arranged to receive said command signals, including switching means for said transmitter to initiate radiation command signals to enable an operator to selectively point at a target and issue a command radiation signal for execution by said reference station.

7. The system of claim 6 wherein said reference station comprises more than two receivers, forming a plurality of different directional receivers, said computer means being programmed to determine said direction of said remote control device from said reference station in two dimensions.

8. The system of claim 6 wherein said computer means is programmed to determine from the absolute intensity of radiation monitored at said receivers the distance of said remote control device from said reference station.

9. The system of claim 6 wherein said radiation is pulsed infra red radiation.

10. The system of claim 6 wherein said fixed reference station further comprises a transmitter, said movable remote control device further comprising two receivers, means for monitoring the intensity of radiation received by said receivers of said remote control device, means for transmitting, via said transmitter of said remote control device to said receivers of said reference station, information relating to said monitored intensities, said computer means programmed to determine the direction of said reference station from said remote control device using a comparison of said intensities monitored at said remote control device.

11. The system of claim 6 wherein said receivers point in different directions.

12. The system of claim 6 wherein said receivers are optical receivers positioned behind a lens and on opposed sides of an optical axis thereof.

13. A remotely controllable position indicator system comprising a movable remote control device controllable to transmit command radiation signals, and a fixed reference station adapted to execute commands represented by said command radiation signals, said remote control device further comprising two transmitters forming one directional transmitter and said fixed reference station further comprising two receivers, forming a directional receiver means for monitoring the intensity of radiation received by each of said receivers, means for distinguishing between the radiation from one of said two transmitters and the radiation from the other of said two transmitters and computer means programmed to determine the direction of said remote control device from said reference station and the direction of said reference station from said remote control device using a comparison of monitored intensity of radiation received by each receiver of said directional receiver from a single one of said transmitters to give the direction of said transmitters from said directional receiver and using a comparison of monitored intensity of radiation received by each receiver of said directional receiver from each of said two transmitters of said directional transmitter to give the direction of said directional receiver from said directional transmitter, in which one or more of said two transmitters is controllable to transmit radiation command signals and said two receivers are arranged to receive said command signals, including switching means for said one or more transmitters to initiate radiation command signals to enable an operator to selectively point at a target and then issue a command radiation signal for execution by said reference station.

14. The system of claim 13 wherein said remote control device further comprises more than two transmitters, forming a plurality of different directional transmitters, and said reference station comprises more than two receivers, forming a plurality of different directional receivers, and said computer means is programmed to determine said direction of said remote control device from said reference station and said direction of said reference station from said remote control device in two dimensions.

15. The system of claim 13 wherein said computer means is programmed to determine from the absolute intensity of radiation monitored at said two receivers the distance of said remote control device from said reference station.

16. The system of claim 13 wherein said radiation is pulsed infra red radiation.

17. The system of claim 13 wherein the directional transmitter further comprises two additional transmitters and the directional receiver further comprises two additional receivers such that said transmitters of the directional transmitters are arranged to transmit in four directions positioned equally around a central pointing axis of said remote control device each at approximately 15° to said central axis and said receivers of the directional receiver comprise four directional elements positioned equally around a central axis with each element positioned at approximately 15° to a central receiving axis.

* * * * *